(12) United States Patent
Swinkels et al.

(10) Patent No.: US 6,795,394 B1
(45) Date of Patent: Sep. 21, 2004

(54) DATA NETWORK HAVING ENHANCED AVAILABILITY OF EXTRA TRAFFIC

(75) Inventors: Gerard L Swinkels, Brampton (CA); Craig T Dann, London (GB); Dave Langridge, Stansted (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/558,573

(22) Filed: Apr. 26, 2000

(51) Int. Cl.[7] ............................................. H04L 1/00
(52) U.S. Cl. ...................................... 370/222; 370/221
(58) Field of Search ............................... 370/221, 222, 370/223, 224, 227, 228, 216

(56) References Cited

U.S. PATENT DOCUMENTS

| | | | |
|---|---|---|---|
| 4,837,760 A | | 6/1989 | Reid et al. |
| 5,159,595 A | * | 10/1992 | Flanagan et al. ............ 370/224 |
| 5,216,666 A | | 6/1993 | Stalick |
| 5,495,472 A | * | 2/1996 | Ohara ......................... 370/224 |
| 5,818,816 A | * | 10/1998 | Chikazawa et al. .......... 370/225 |
| 6,144,633 A | * | 11/2000 | Ikeda et al. .................. 370/217 |
| 6,163,527 A | * | 12/2000 | Ester et al. .................. 370/228 |
| 6,400,859 B1 | * | 6/2002 | de Boer et al. ............... 385/24 |
| 6,567,194 B1 | * | 5/2003 | Badr .......................... 370/222 |

FOREIGN PATENT DOCUMENTS

| | | | |
|---|---|---|---|
| EP | 949777 A2 | * 10/1999 | ............ H04J/14/02 |
| EP | 977394 A2 | * 2/2000 | ............ H04J/14/02 |
| WO | WO 98/47039 | 10/1998 | |

OTHER PUBLICATIONS

Magill, R.B. "A Bandwidth Efficient Self–Healing Ring for B–ISDN". ICC 97 Montreal, 'Toward the Knowledge Millennium'. 1997 IEEE International Conference on Communications. Montreal, Quebec, Canada. Jun. 1997. vol. 3. pp 1572–2576.*

Xiaojun, Fang et al. "All–Optical Four–Fiber Bidirectional Line–Switched Ring". Journal of Lightwave Technology. Aug. 1999. vol 17. pp 1302–1308.*

* cited by examiner

Primary Examiner—Hassan Kizou
Assistant Examiner—Donald L Mills
(74) Attorney, Agent, or Firm—Barnes & Thornburg LLP

(57) ABSTRACT

In a network having working and protection paths, extra traffic is put on the protection paths when they are not being used by working traffic. In the event of a fault in a working path, the working traffic is switched to a respective protection path using a span switch operation. The extra traffic is displaced, but at least some of it is protected by switching it to an alternative path using a ring switch operation.

22 Claims, 11 Drawing Sheets

DATA NETWORK HAVING ENHANCED AVAILABILITY OF EXTRA TRAFFIC

FIELD OF THE INVENTION

The present invention relates to data networks, to nodes for such networks, to methods of transmitting data, and to corresponding software. More particularly, it relates to data transmission networks having working paths and secondary paths for use by working traffic when there is a fault on the working path.

BACKGROUND TO THE INVENTION

A number of mechanisms are known for handling fault conditions in data transmission networks or systems. At higher levels of the well known OSI hierarchy, packets may be buffered and resent. At lower levels of the OSI hierarchy, if there is control over the route taken by the data, then an alternative route through the network can be tried. An example of an OSI layer 1 protocol, is SONET, and its equivalent outside North America, SDH. Such layer 1 transmission systems typically have secondary (usually termed protection) paths arranged such that working traffic is switched on to these secondary paths in the event of failure at a node or on a line between nodes of the system.

Typically, the nodes and lines are arranged to form rings. The protection paths are typically arranged either in the form of dedicated path protection rings (DPRing) or shared protection switched rings (SPRing). There are two kinds of SPRing, unidirectional line switched rings, or bi-directional line switched rings (BLSR). Bell Core Standard GR-1230-CORE Issue 2, defines BLSR for SONET. The standard includes protocols for extra traffic to use the protection paths when they are not in use by the working traffic. Paths are defined here as extending between neighbouring nodes, so typically data will pass over several such paths to reach its destination. Many paths can be multiplexed onto a single span, e.g. by time division multiplexing according to SONET/SDH standards, or by wavelength division multiplexing for example.

Where there is a ring configuration, and a fault is detected on a line on the working path, there are two possibilities in principle, for re-routing the working traffic to avoid the faulty line. Firstly, it could be switched on to the protection path on the same span as the faulty working path. This is known as a span switch. Secondly, the working traffic could be routed on the protection path the other way around the ring, using spans other than the faulty span. This is called a ring switch. In general, span switching is preferred since it occupies fewer of the protection paths available on the ring. This means several span switches may occur on the same ring, but only one ring switch.

There has long been a concern about the bandwidth efficiency of such systems, if 50% of the total bandwidth is reserved for the protection paths. Many efforts have been made to improve the efficiency. For example, extra traffic is carried on the protection channels. This extra traffic differs from working traffic in the treatment accorded to it at higher levels of the well known OSI hierarchy, such as priority level, charging rate, monitoring and so on. At the transport layer, it is treated the same as other traffic except for being given a lower priority under fault conditions, so it is unprotected and is automatically removed if a protection request is made, to switch the working traffic on to the protection path. In practice, it proves hard to derive much revenue from unprotected traffic.

Other attempts to improve bandwidth efficiency have involved efforts to share the protection path between several working paths. For example, where neighbouring rings overlap, a single protection path can serve both rings.

If the interconnections between nodes are arranged in a mesh rather than in one or more rings, then there may be many routes between any pair of nodes. In this case, in the event of a fault on one span, the traffic can be divided and sent over the protection paths for the various alternative routes to the destination node. Thus each protection path can have much less than 50% of the bandwidth of a given span between nodes, and the overall bandwidth efficiency can be much greater than 50% and still guarantee protection against any single fault. Again extra traffic can be sent over the protection paths. Compared to ring arrangements, the main drawback of mesh networks is the complexity of managing the network and deciding which protection paths to use in the event of a fault. Even if this is pre-calculated, changing traffic patterns may warrant complex re-configurations.

Yet other attempts at improving efficiency have involved removing completely unused working paths.

In summary, network operators perceive rings to be inefficient, and meshes to be efficient, yet difficult to manage and operate. Extra traffic to make use of the idle protection bandwidth is seldom used, because span switches occur often enough to cause too many outages on the extra traffic.

SUMMARY OF THE INVENTION

It is an object of the invention to provide improved arrangements which address the above mentioned problems.

According to the invention there is provided a communication network comprising a plurality of nodes linked by spans, to carry working paths between the nodes for use by working traffic and to carry protection paths, the nodes being arranged to use the protection paths for extra traffic, when the protection paths are not being used for working traffic, the nodes being arranged to use one or more of the protection paths for working traffic in the event of a fault on one of the working paths, and thus displace extra traffic from the protection path or paths used by the working traffic, the nodes further being arranged to use an alternative path to protect at least some of the displaced extra traffic.

Having at least some of the extra traffic protected rather than being discarded, in the event of a fault, can enable better bandwidth utilisation, regardless of how the working traffic is protected. Furthermore this way of achieving better bandwidth utilisation may be simpler to manage and operate compared to trying to achieve a corresponding bandwidth utilisation improvement in other known ways such as by providing more meshed paths for a mesh restoration of the working traffic. While this known method has the disadvantage of introducing more complexity into managing the switching decisions for the mesh restoration, the invention can be combined with such known methods or be regarded as an alternative.

Preferred Features

Preferably the alternative path comprises at least some of the protection paths not occupied by working traffic. This can be simpler and easier to manage and operate because these paths may be of the same type, same level of service and so on. Also this can improve levels of bandwidth utilisation, since more protected traffic can be accommodated.

Preferably at least some of the protection paths form a protection ring and the alternative path comprises the remainder of the protection ring to the part normally used by the respective extra traffic. This use of the other way around the protection ring provides a guaranteed alternative path and is easier to manage and operate than a mesh arrangement of protection paths. Each node need be aware only of the node in its own ring, not of the entire network. Rings inherently provide predetermined routes between nodes, making management and operation simpler and faster.

Preferably the nodes are arranged such that there is a predetermined configuration of which of the protection paths are used to protect respective ones of the working paths. This enables protection to occur more quickly.

Preferably the nodes are arranged to send the extra traffic simultaneously both ways around the protection ring. This simplifies the protection of the extra traffic because under single fault conditions, the extra traffic is already present on an alternative path and so the need for switching is avoided and the protection can occur more quickly. UPSR (unidirectional path switched ring) is an example of this.

Preferably the alternative path is formed by providing path loop back either side of the fault, the nodes further being arranged to pass this extra traffic around the protection ring to its destination. This is simpler than head end ring switching because only the nodes which provide the loop back need to change to create the alternative path. For head end ring switching, the nodes where the extra traffic enters the ring must change which direction they send the extra traffic around the ring. This is more complex because many nodes must change. However the loop back scheme may use more bandwidth than head end ring switching because any traffic using the loop back will pass twice over the same span. This will be relatively easy to manage, and fast to configure, because each node needs only to decide whether it is a loop back node or an intermediate node. Then in operation, each node simply identifies whether incoming traffic on the protection ring should be dropped or passed through. There is no need for each node to be aware of the arrangement of other nodes on the ring.

Preferably the above mentioned bi-directional rings for the working paths are combined with the above mentioned arrangement of protection paths in the form of a ring. This enables the advantages of rings to be obtained for both levels of protection, that is protection of the working traffic, and protection of at least some of the extra traffic.

Preferably the ring for the working traffic comprises a four fibre BLSR, and the ring for the protection path is in the form of a two fibre BLSR. This enables the invention to be applied to the large installed base of the four fibre BLSRs, and obtain the advantages of both types of BLSR. More specifically, well defined protocols already exist for both types of BLSR and therefore implementation will be easier.

Preferably the working paths are linear and the protection paths form a ring. For example 1:n, 1:1 or m:n arrangements (where n and m are positive integers) are conceivable. If the protection paths are shared between many working paths in a 1:n arrangement, a priority scheme will be used to determine which of the working paths is protected. This is essentially independent of and complementary to the priority scheme for the extra traffic described above.

Preferably, the extra traffic is pre-configured into two levels of priority, the higher priority extra traffic being protected, the lower priority extra traffic being discarded in the event of a fault. By predetermining the priority of the extra traffic, the higher priority extra traffic can be guaranteed to a higher level of reliability.

Preferably the protection of the working traffic or of the displaced extra traffic is carried out according to signalling in SONET/SDH overhead.

Preferably the protection paths are arranged in a mesh. This may enable more of the extra traffic to be protected so the efficiency can be improved, though at the expense of more complexity.

Preferably the re-routing comprises head end switching. This involves determining which direction to route traffic around the ring, at the point of adding the traffic to the ring, and enables the shortest path to be taken, to avoid the need for a loop back. This involves more complex configuration but may enable better use of bandwidth on a ring. This is more efficient than loop back or UPSR since it takes the shortest route. However it may be more complex to manage and operate because each source and destination node must know enough to send/receive traffic to/from the shortest path.

Preferably the nodes are arranged to time division multiplex working traffic from different sources over the same working path.

Preferably the switching of the working traffic is carried out in the optical domain.

Preferably the nodes are arranged to wavelength division multiplex working traffic from different sources onto the same working path, and wavelength division multiplex the protection and working paths on a respective span.

Other Aspects of the Invention

According to another aspect of the invention there is provided a data transmission network comprising a plurality of nodes, an arrangement of high priority paths between the nodes, for carrying high priority traffic and a plurality of lower priority paths between the nodes, for use by the high priority traffic in the event of a fault in one of the high priority paths, and for use otherwise by lower priority traffic, the lower priority paths forming a ring, the nodes being arranged to carry out a span switch operation to replace a respective one or more of the high priority paths by a corresponding one or more of the lower priority paths, the nodes further being arranged to carry out a ring switch to send at least some of the lower priority traffic around the ring of lower priority paths, and avoid those of the low priority paths used by the span switch operation.

The combination of a span switch to protect data traffic on the high priority paths and a ring switch to protect the lower priority traffic can enable the lower priority traffic availability to be enhanced in a way which makes better use of the lower priority paths without affecting the high priority paths. Also, span switching and ring switching can be implemented using well established techniques, and so the advantages can be obtained with less risk and cost than other techniques. Furthermore, span and ring switching can be more rapid than mesh schemes for example, since intermediate nodes need not be reconfigured, and there is no need to spend time calculating which is the optimum route.

The high priority paths may be working paths, the low priority paths may be protection paths, and the lower priority traffic may be extra traffic for example, though clearly the invention is applicable beyond these examples.

According to other aspects of the invention, there are provided a node for use in the above network, a method of operating a network, a method of operating the node, and corresponding software. Any of the preferred features may be combined with any of the aspects set out above as would be apparent to a skilled person. Other advantages will be apparent to a skilled person, particularly in relation to any further prior art other than that discussed above.

DETAILED DESCRIPTION

Figure 1:
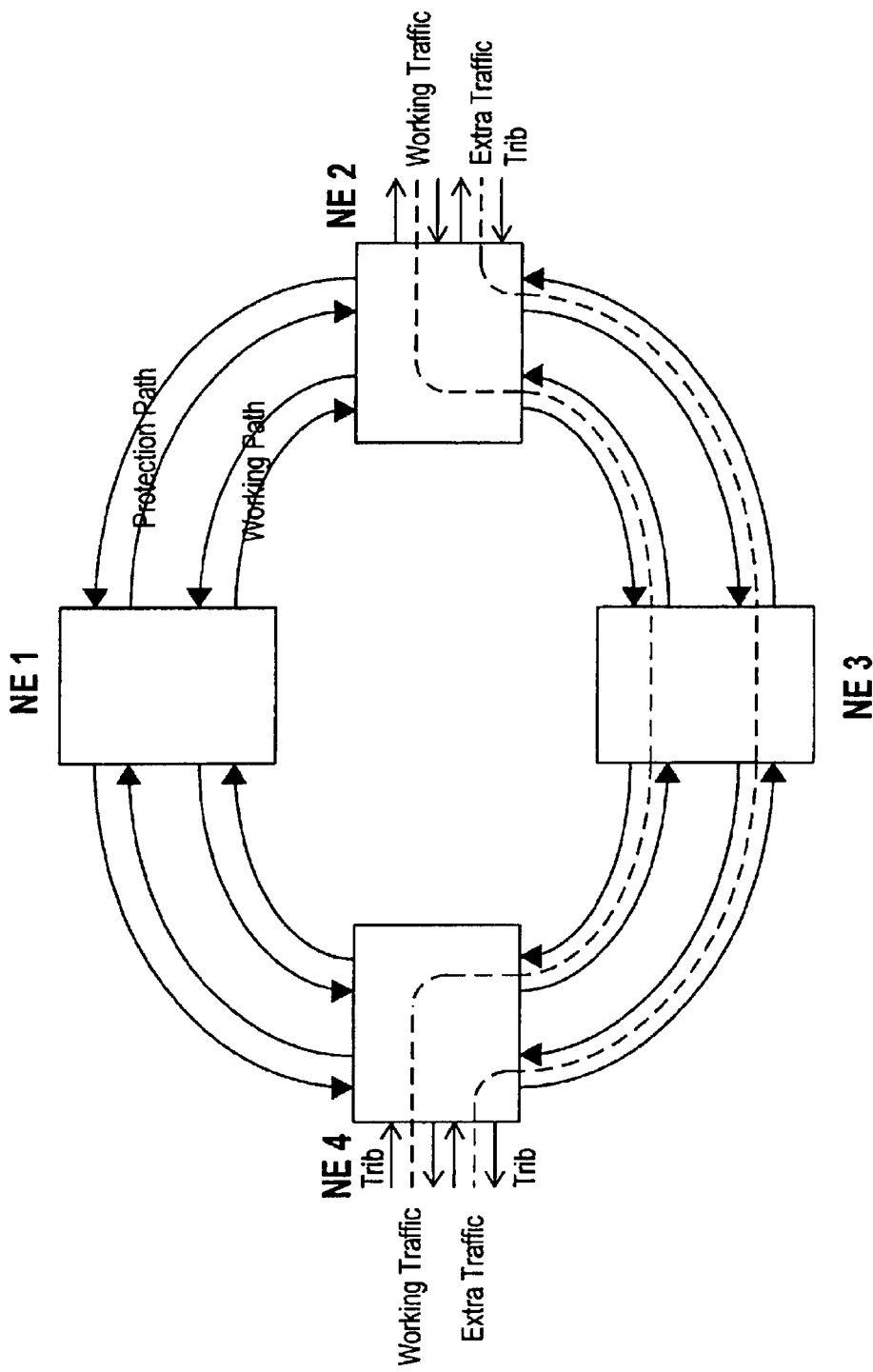
FIG. 1 shows a prior art four fibre BLSR showing a normal working condition with no fault, with extra traffic on the protection paths.

FIG. 1 shows a prior art network comprising four nodes, or network elements NE1–4 connected by bi-directional working paths and protection paths, shown in the figure as solid lines, to form a ring configuration. Working traffic is fed onto the ring via tributary (trib) cards in the nodes. The working traffic is fed onto the working path around the ring to its desired destination node. An example is shown of working traffic illustrated by a dotted line passing from a trib card from NE4 to a trib card NE2 via node NE3. Other working traffic (not shown) could be passed simultaneously over the same working path, or other working paths on the ring.

While the protection paths are not being used, extra traffic can be fed from trib cards onto the protection path and around the ring to its destination. An example of such traffic is shown by a dotted line passing between NE4 and NE2 via NE3. Switching of the working traffic and extra traffic could be carried out according to signalling messages sent between the nodes following the well known 4-Fibre BLSR protocol.

Figure 2:
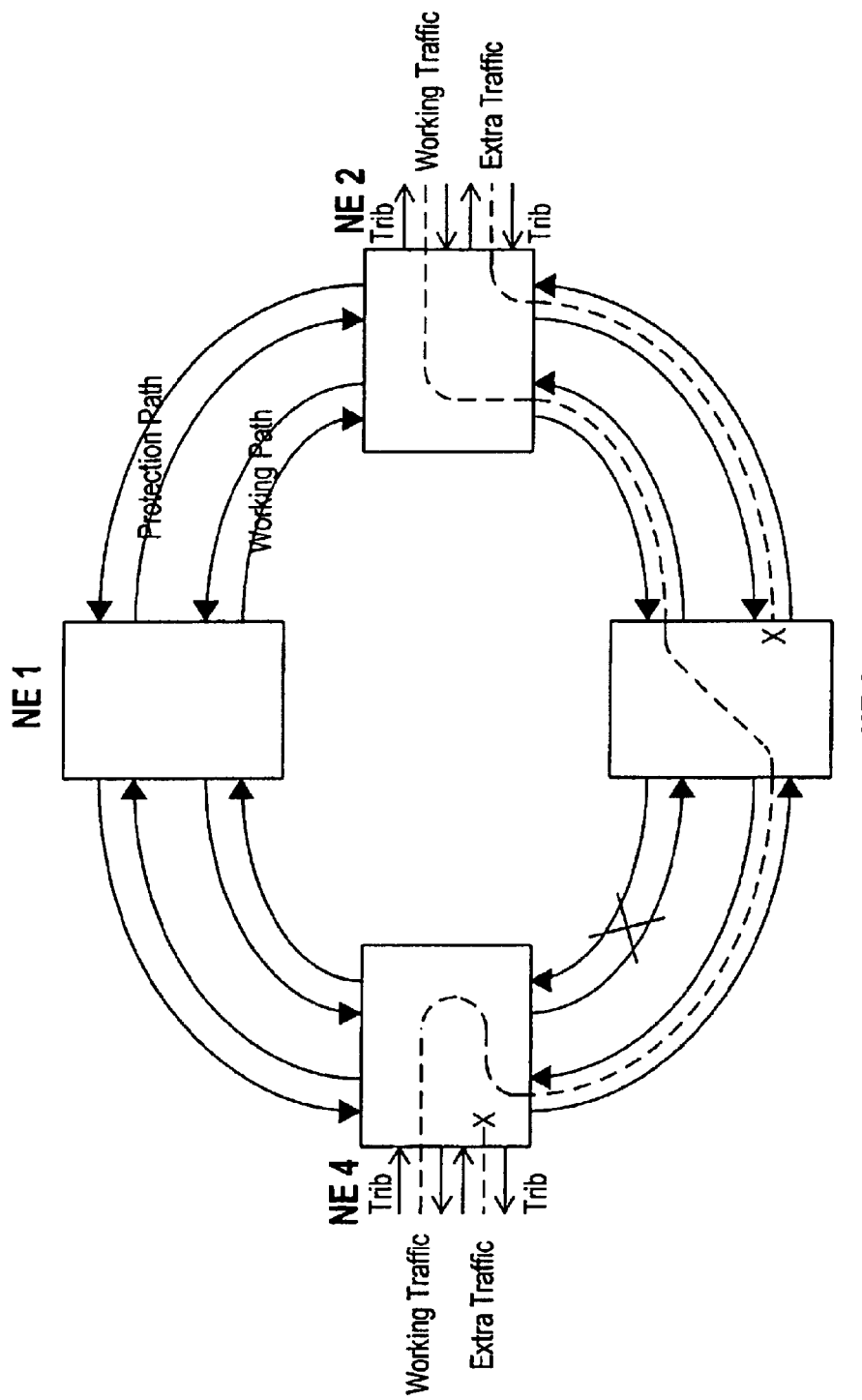
FIG. 2 shows the prior art four fibre BLSR of FIG. 1 showing a fibre break on the working path, and a conventional span switch operation.

FIG. 2 shows the arrangement of FIG. 1 under the condition of a fault in the working path between NE3 and NE4. As illustrated, the working traffic is diverted onto the protection path by nodes NE4 and NE3 at either side of the fault. The same nodes NE3 and NE4 discard the extra traffic that was originally on that protection path.

Figure 3:
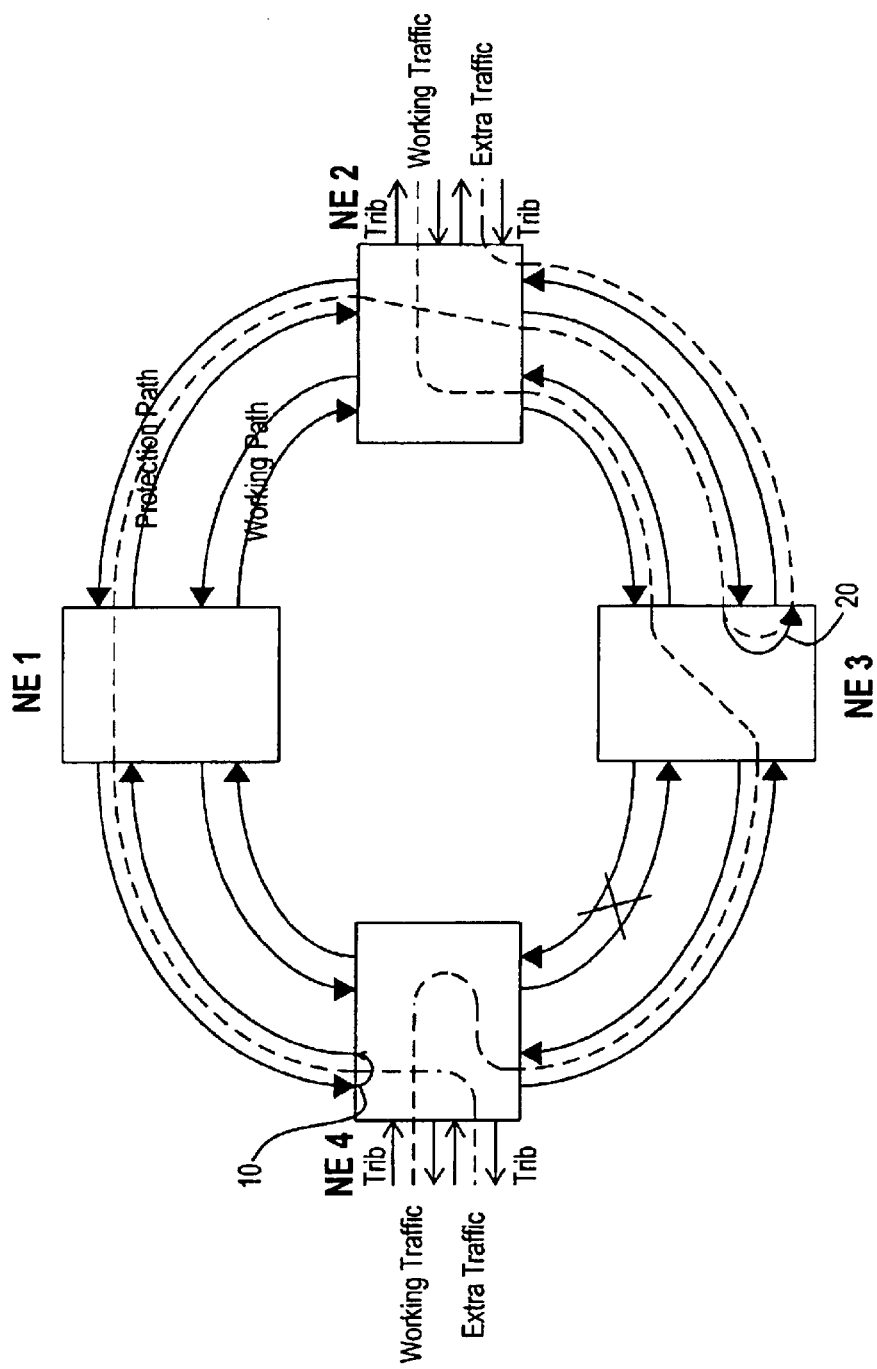
FIG. 3 shows an embodiment of the invention, showing a two fibre ring switch on the protection path, in addition to span switch on the working path shown in FIG. 1.

FIG. 3 shows the same fault condition and shows the operation according to an embodiment of the invention. In this case, at least some of the extra traffic is protected instead of being discarded. It is diverted by nodes NE3 and NE4 to pass the other way around the ring. The working traffic is routed in exactly the same way as shown in FIG. 2. The nodes may bridge the fault between NE4 and NE3 by effectively re-routing extra traffic around the ring by creating a loop back, 10, 20 on the protection path at each side of the fault.

Figure 4:
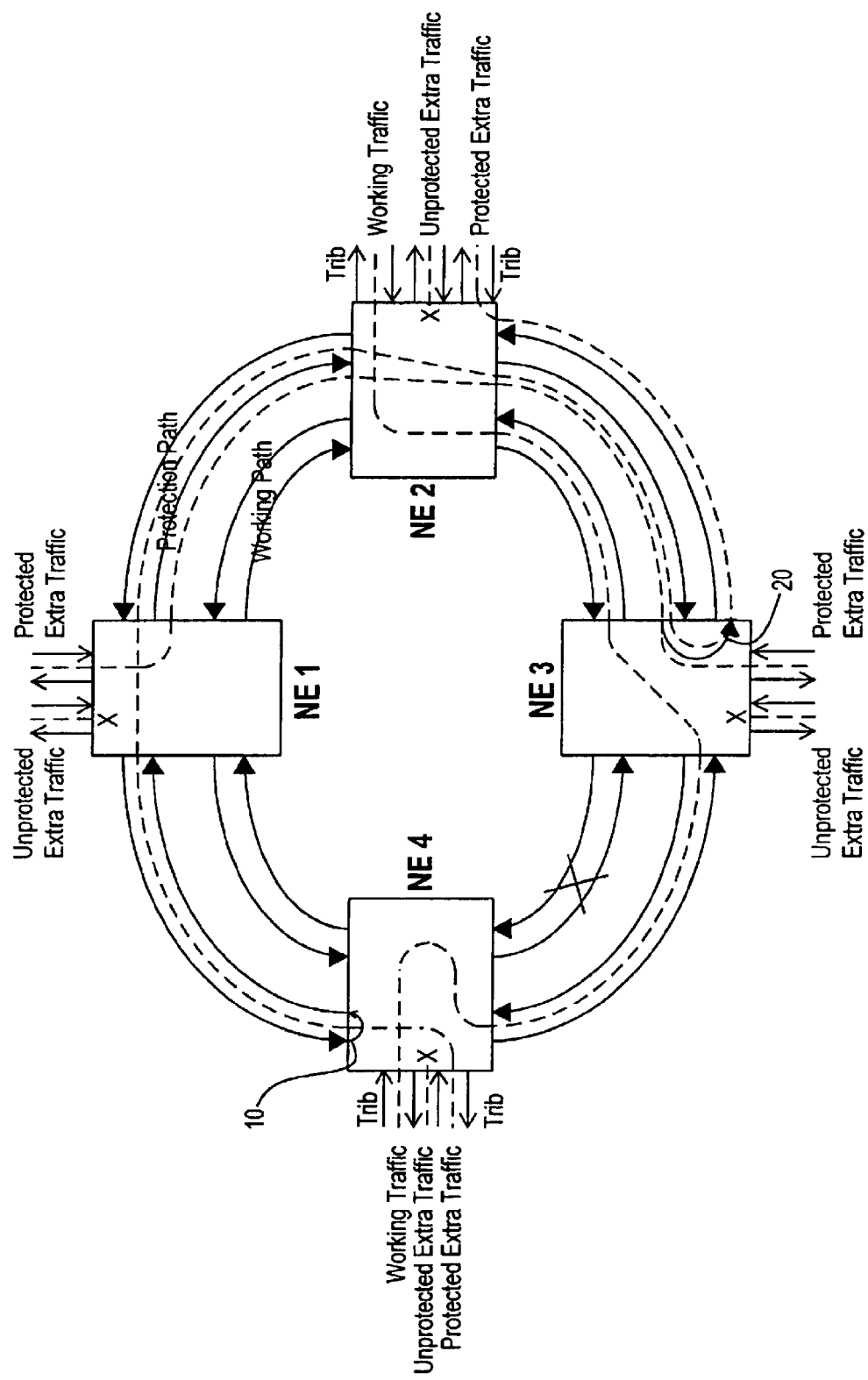
FIG. 4 shows the arrangement of FIG. 3 with both protected and unprotected extra traffic.

This can be achieved by following the well known protocol for a 2-Fibre BLSR ring switch for example. (Other alternatives include UPSR, and head end switching, as described in more detail below.) This embodiment of the invention can be implemented relatively quickly and straightforwardly by a combination of 4-fibre BLSR span switching of the working traffic, and a 2-fibre BLSR ring switch on the protection path. In practice such ring switching may be implemented conveniently using already existing software, and require only appropriate triggering after a span switch has been triggered. The unprotected extra traffic is completely displaced from the protection ring to allow the ring switch to occur, as shown in FIG. 4. It is possible to envisage embodiments for which there is sufficient bandwidth on the protection paths so that it may not be necessary to discard all of the unprotected extra traffic. The loop back of the displaced extra traffic as shown at NE3 means that at least between NE2 and NE3, twice as much bandwidth is used compared to the non fault condition. This may mean that other extra traffic will have to be discarded on this span. Also, it may be necessary to discard traffic from other spans to make way for the displaced extra traffic.

A priority scheme can be implemented to determine which of the extra traffic is protected and which is discarded. This is preferably pre-configured, at the time of setting up the extra traffic, rather than at the time of detecting a fault. This can give rise to three levels of service: "Gold" service for traffic on working paths, "Silver" for traffic on protection paths but itself protected, and "Bronze" for unprotected traffic on protection paths. Different levels of service could be subject to different charging rates.

FIG. 4 shows the arrangement of FIG. 3 but with two more extra traffic flows illustrated between NE1 and NE3, and with two extra traffic flows between NE2 and NE4. Owing to the fault condition in the working path, both extra traffic flows between NE2 and NE4 are displaced. One is higher priority than the other, and is protected by activating the 2-fiber ring switch on the protection ring, as shown in FIG. 3. The other, (labelled unprotected extra traffic) is discarded by the tribs before entering the protection ring, as illustrated by a cross in the nodes.

Of the two extra traffic flows between NE1 and NE3, again one is higher priority (labelled protected extra traffic) than the other. In this example there is insufficient bandwidth on the spans between NE1 and NE3, so the activation of the 2-fiber ring switch on the protection path and the re-routing of the displaced protected extra traffic, will in turn cause the unprotected extra traffic between NE1 and NE3 to be discarded. This is illustrated by the dotted line for the unprotected extra traffic being terminated with a cross at the node rather than continuing around the ring.

Figure 5:
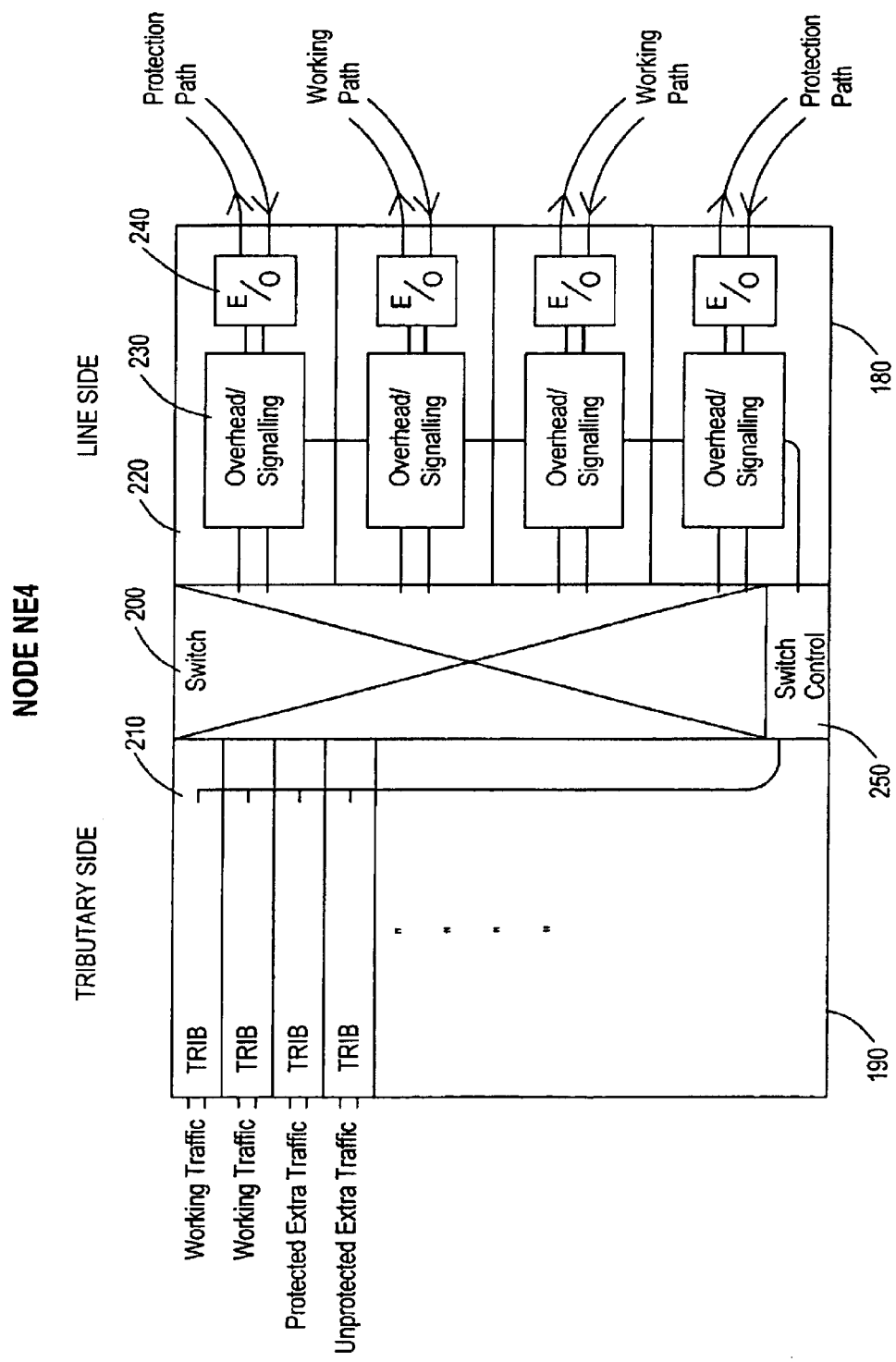
FIG. 5 shows the construction of a typical node in more detail.

FIG. 5 shows in schematic form some of the principal features of an example of a node NE1–4 as used in FIG. 3 or 4. A switch 200 is coupled to all the working and protection paths (lines) on the "line side", 180, and to all the tribs on the "tributary side" 190. Typically each trib is brought in to the switch on a trib card 210 which carries out various interface functions such as conversion en electrical and optical domains, clock recovery, synchronisation, reading of overhead bits and so on. Typically each line is brought into the switch on a line card 220 which includes electrical to optical conversion 240, and an overhead/signalling processing function 230. As illustrated, the line and trib cards are coupled to the switch to feed traffic to and from the switch. The line and trib cards are coupled to a switch control function to pass status, signalling and control information between the cards and the switch control function. Conventional hardware would be used for the various elements of the node, chosen according to meet appropriate design criteria for speed, processing capacity, reliability and so on.

The switch 200 is arranged to be able to switch traffic from any trib onto any of the lines, and vice versa. The switch may be implemented as a three stage close configuration, or in other known configurations. When switching traffic it will be arranged to bridge the traffic onto both old and/new paths before switching off the old path, to ensure continuity. The switch control function 250 is arranged to control the switch according to a state machine, and according to inputs from lines and tribs as to their state and any messages received from other nodes.

To achieve ring or span type protection switching, in nodes need to pass messages to each other to co-ordinate the process. (A central network controller would be a possible alternative, but would operate too slowly for many applications). Typically, messages are passed using overhead bits in the SONET/SDH frames, such as the K1 and K2 bytes (also known as APS bytes) of the SDH multiplex section overhead. They are usually sent only on the protection path rather than the working path. (A possible alternative would be to use a separate signalling network or a separate signalling channel perhaps on a separate optical wavelength or separate fiber.) These "stolen" overhead bits are inserted and read by the line cards, and the appropriate status or command information is passed between the line card and the switch control. Some of the principal operations of a network such as that shown in FIGS. 3, 4 and 5 are shown in more detail in FIGS. 6, 7 and 8.

Figure 6:
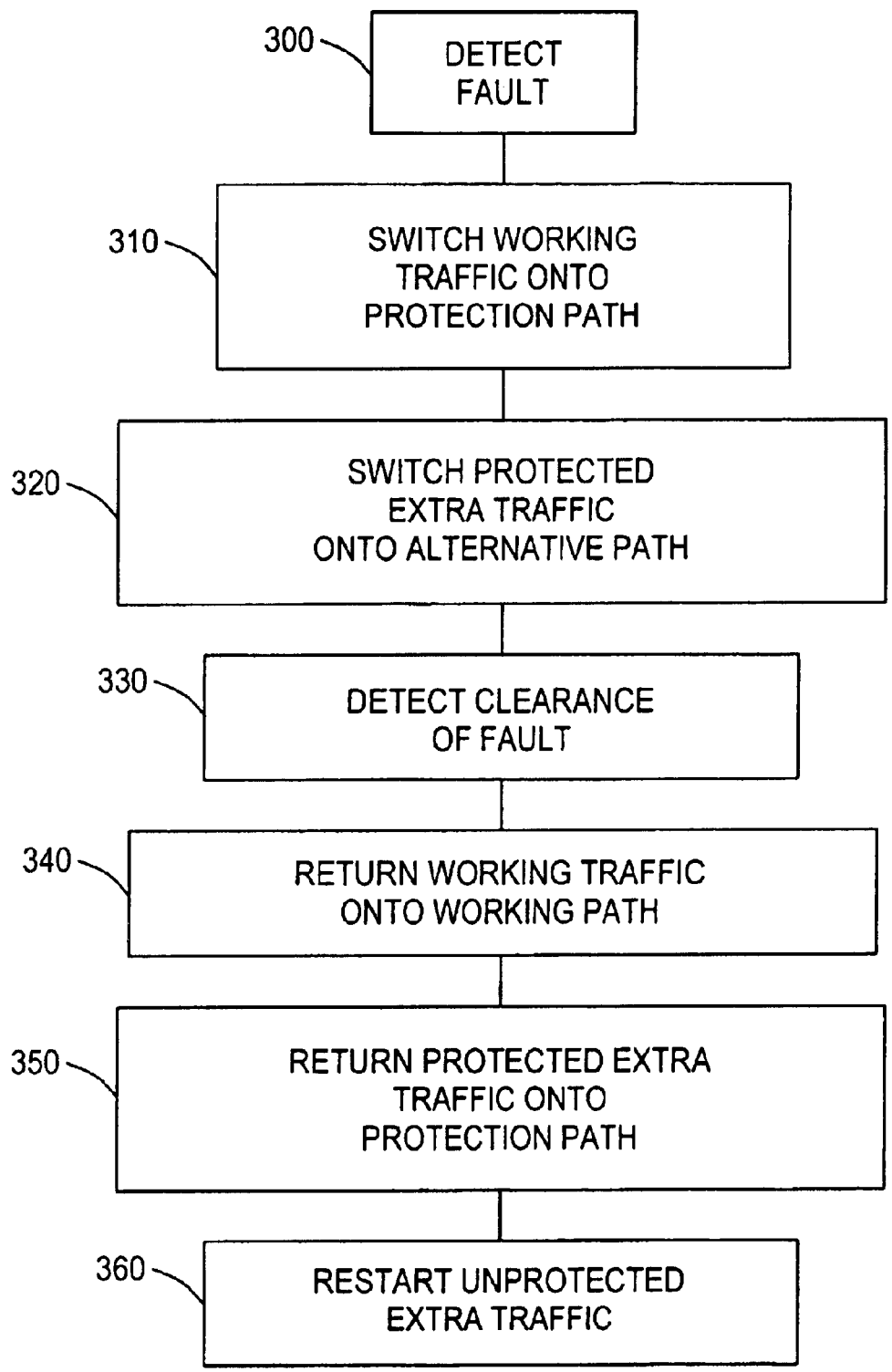
FIG. 6 shows a sequence chart of the operation of the network following detection of a fibre break.

FIG. 6 shows a flow chart of a protection switch and corresponding return to the original state. At 300 a fault on a working path is detected, e.g. at one of the line cards, which feeds status information to the switch control. Fault detection can also encompass deliberate triggering of a protection switch by a network operator, e.g. to take down a line for maintenance. At 310 this causes the working traffic to be switched to the protection path. More details of an example of this step are shown below with reference to FIG. 7. At 320 the displaced extra traffic is moved onto the alternative path. More details of an example of this step are shown below with reference to FIG. 8. These two steps could be carried out in reverse order, or simultaneously. Whenever the fault is cleared, and this is detected at 330, the working traffic is returned to the working path at 340. At 350 and 360, the protected extra traffic and any unprotected extra traffic are returned to the protection path.

Figure 7:
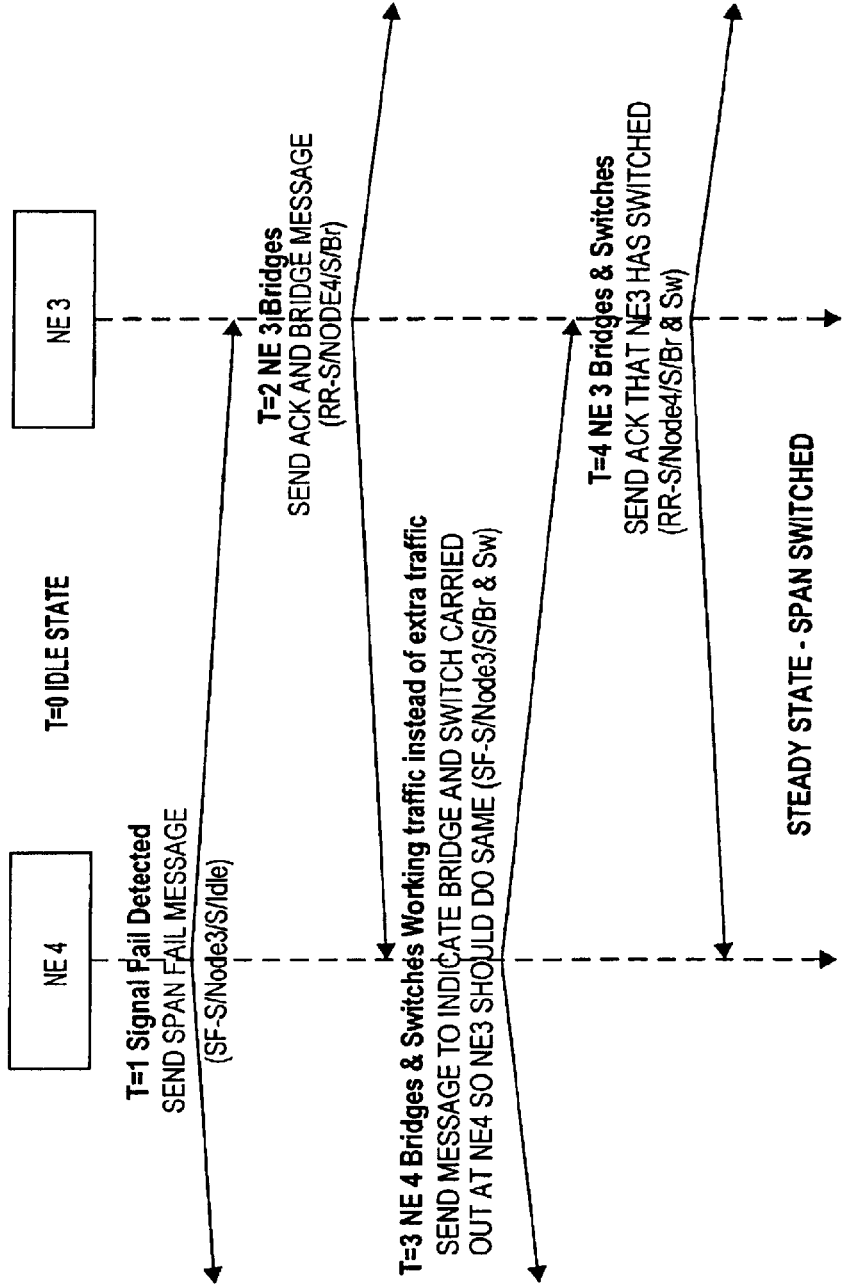
FIG. 7 shows an example of messaging activity according to the span switch part of the sequence chart of FIG. 4 in more detail.
Figure 8:
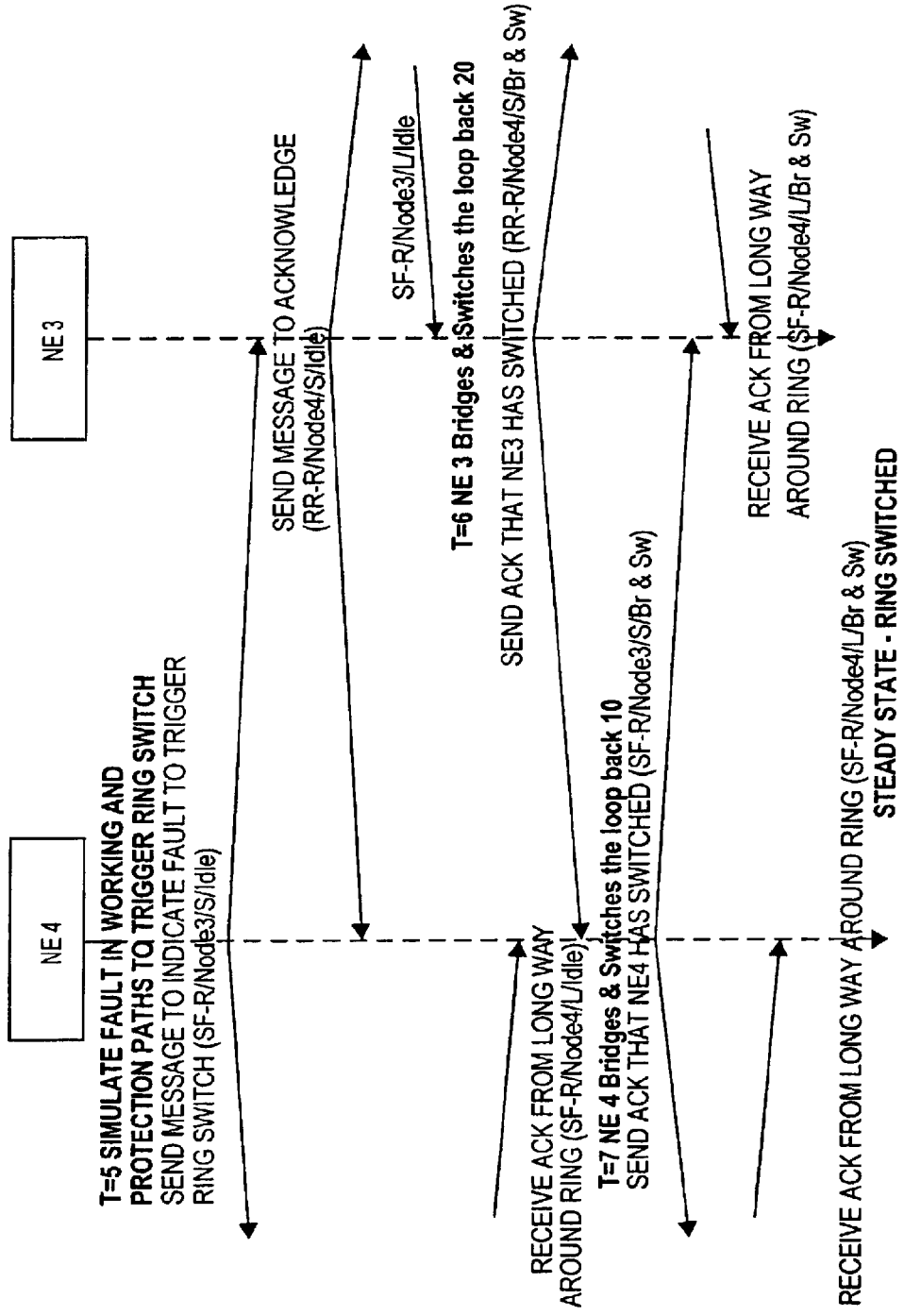
FIG. 8 shows an example of messaging activity according to the ring switch part of the sequence chart of FIG. 4 in more detail.

FIGS. 7 and 8 show a message sequence for an example where the protection switch steps 310 and 320 of FIG. 6, are implemented by a consecutive 4-fiber span switch and a 2-fiber ring switch of the protection path. The signalling protocol for each of these switches is documented in ITU-T G.841 and GR-1230, though without an indication that they can be combined as set out here to protect the extra traffic. Messages sent by NE4 are shown in sequence down the left side of the figure, starting at the top. Arrows going to the left and right indicate message being sent both ways around the ring. At T=1, a signal fail is detected, and a span fail message is sent by NE4, to all nodes on the ring. In response, NE3 sends an acknowledge and bridge command at T=2. Other nodes are alerted to ensure they do not start a conflicting operation such as a 4-fiber ring switch. Other span switches may still be allowed.

At T=3 NE4 bridges and switches the working traffic onto the protection path under control of the switch control state machine. This automatically cuts off the extra traffic originally switched onto the protection path. The respective tribs for the extra traffic will manage this event and either start the protection operation for a protected traffic flow, or alert the traffic source if the traffic is being discarded. NE4 then sends a message to indicate the bridge and switch has been carried out, which enables NE3 to do the same at T=4. An acknowledgement message that this has been carried out is then sent from NE3 to all nodes to indicate the span switch operation is complete.

FIG. 8 shows the extra traffic protection operation, which may start after the span switch operation is complete, or preferably starts earlier, to reduce the amount of extra traffic lost during the protection switch. Preferably the extra traffic ring switch is triggered immediately after T=3, so that it is certain that the span switch has taken place, and the signal fail is confirmed by NE3 and is not a spurious transient failure indication. To trigger the extra traffic protection, either the state machine can be configured appropriately, or the tribs and line cards can be configured to simulate external conditions to cause the state machine to trigger a ring switch on the protection ring.

At T=5 this trigger occurs and a message is sent from NE4 to indicate this. This is acknowledged by NE3. At T=6, when NE3 has received the message from the other (long) way around the ring, and therefore knows the paths around the other way are still operating, NE3 will bridge and switch to configure the loop back 20. NE3 sends a message to indicate it has done this, and at T=7, NE4 does the same and sends a message indicating it has done so. Once both acknowledgement messages have passed the long way around the ring, all nodes are aware the ring switch is complete, and the steady state is reached.

A corresponding sequence of messages would be used to return the working traffic to the working path and the extra traffic to its original state when it is detected that the fault condition has been cleared.

Although the embodiment described above shows a 2-fiber ring switch on the protection path, different sequences can be used for a UPSR example, or a head end ring example, or a 1:n protection arrangement where n is a positive integer. The details of implementation for these and other examples would be would be apparent to a person skilled in the art and so need not be described further here.

Figure 9:
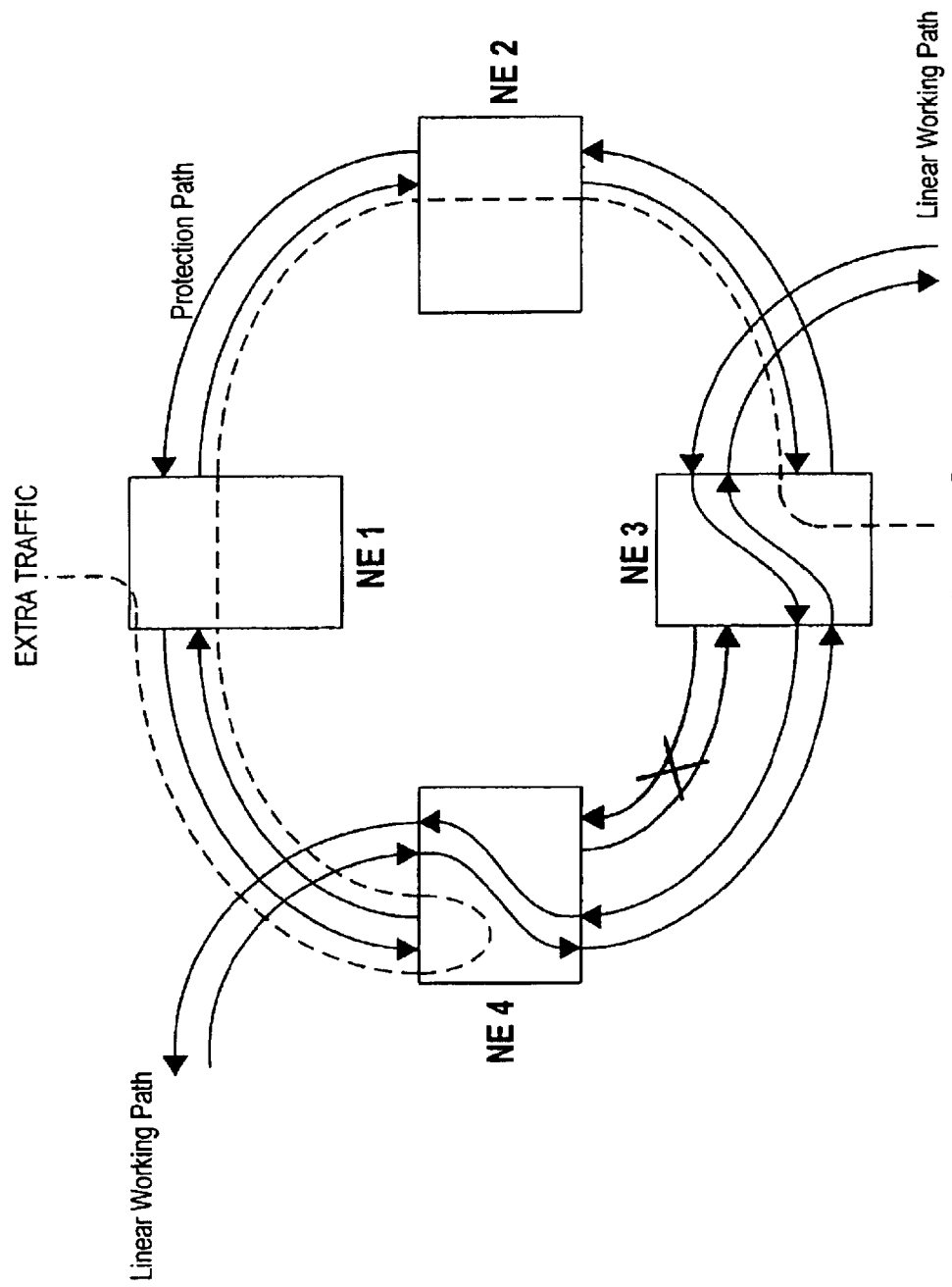
FIG. 9 shows an example of the invention applied to a linear arrangement of working parts.

FIG. 9 shows how the invention can be applied to a linear working path network with a protection ring. The operation can be exactly as shown in FIGS. 3 to 8 above. The protection ring provides an example of an alternative path for the extra traffic. The ring may protect just one of the working path spans, or more than one as shown. The same protection ring can be used to protect more than one separate linear network of working paths. The figure shows how protected extra traffic would be routed under fault conditions. This extra traffic under normal conditions would have used the spans from NE1 to NE 4 then to NE3. Under the fault condition shown, the extra traffic is passed from NE1 to NE4, then looped back to NE1, then NE2 then to its original destination NE3, and vice versa for extra traffic in the opposite direction.

Where there is a grid of north south and east west linear networks, many protection rings can conveniently be provided in the "holes" in the grid, to make use of the existing transmission routes, and simply allocating some of the bandwidth to protection paths, and linking the paths at the intersecting nodes to form rings. Extra traffic can then be protected as described above. The working path network could also be in the form of a mesh of linked working paths, if there was provision for protection paths able to carry extra traffic.

Figure 10:
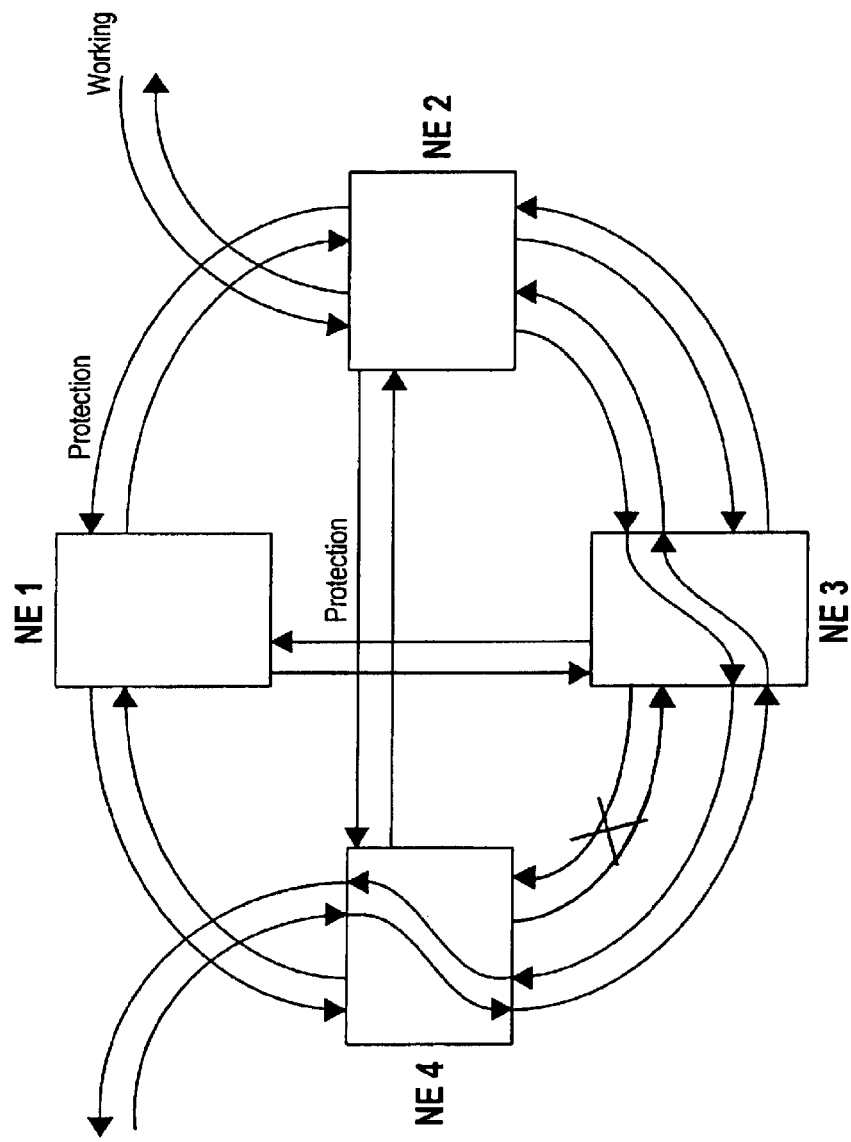
FIG. 10 shows an example of the invention using a mesh network of protection paths.

FIG. 10 shows another embodiment in which the alternative path is provided by a mesh of protection paths.

Although shown with a linear working path network, it could equally be applied to a mesh or ring network of working paths. The mesh of protection paths introduces more complexity since each node needs to make routing decisions for the protected extra traffic. However, since it may make more bandwidth available for protecting the extra traffic, it may be worth the extra complexity in some cases.

Figure 11:
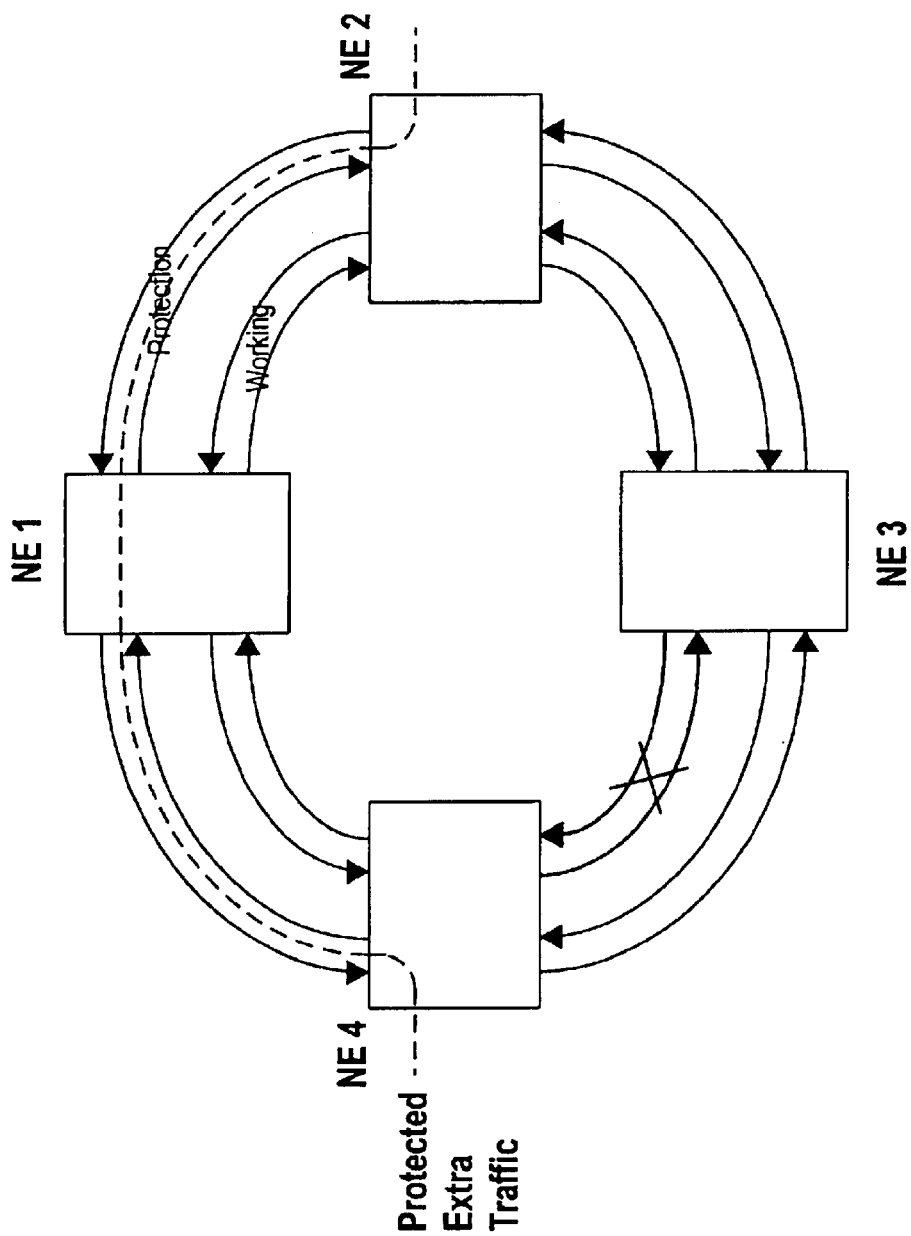
FIG. 11 shows an example using head end switching for the extra traffic.

FIG. 11 shows the 4-fiber BLSR as shown in FIG. 3, but with head end switched protection for the extra traffic, instead of the 2-fiber BLSR switched extra traffic. The working traffic and any unprotected extra traffic are not illustrated, for the sake of clarity. It can be seen that the main difference is that there is no loop back provided at NE3 and NE4, because the extra traffic is switched on and off the ring to take the shortest path avoiding the fault. This means every node which adds or drops extra traffic must decide whether to send the extra traffic clockwise or anti-clockwise around the ring. And every node must be advised which direction to expect the traffic being dropped.

One advantage which arises is that any unprotected extra traffic using the span between NE2 and NE3 is unaffected by the head end switch on the protection ring. Such traffic would have been lost if a 2-fiber ring switch had been used.

Although the examples are described in terms of time division multiplexed SONET/SDH traffic, the same principles can be applied to traffic multiplexed in other ways such as by frequency, by polarisation or by optical wavelength for example. Thus the invention is applicable to optical networks including wavelength routed all-optical networks. In an optical wavelength multiplexed ring with working and protection fibers or wavelengths, an optical switch would be used, capable of switching a given wavelength onto either fiber, or altering the wavelength from a working wavelength to a protection wavelength for example. The same advantages of the invention, from the three levels of priority, or of the combination of span switch and ring switching, can be obtained in such optical networks. Again implementation can follow the same principles set out above and together with established design principles familiar to a person skilled in the art and so need not be described further here.

What is claimed is:

1. A data communication network comprising a plurality of nodes linked by spans, to carry working paths between the nodes for use by working traffic and to carry protection paths wherein at least some of the protection paths form a protection ring, the nodes being arranged to use the protection paths for extra traffic, when the protection paths are not being used for working traffic, the nodes being arranged to use one or more of the from the protection ring for working traffic in the event of a fault on one of the working paths, and thus displace the extra traffic from the protection path of paths used by the working traffic, the nodes further being arranged to use an alternative path comprising the remainder of the protection ring by the displaced extra traffic to protect at least some of the displaced extra traffic.

2. The communication network of claim 1, wherein the nodes are arranged such that there is a predetermined configuration of which of the protection paths are used to protect respective ones of the working paths.

3. The communication network of claim 1, wherein the nodes are arranged to send the extra traffic simultaneously both ways around the protection ring.

4. The communication network of claim 1, wherein the alternative path is formed by providing path loop back either side of the fault, the nodes further being arranged to pass this extra traffic around the protection ring to its destination.

5. The communication network of claim 1, wherein the working paths are arranged in a bi-directional ring.

6. The communication network of claim 1, wherein the ring for the working traffic comprises a four fibre BLSR, and the ring for the protection path comprises a two fibre BLSR.

7. The communication network of claim 1, wherein the working paths are arranged in a linear network and the protection paths re arranged to form a ring.

8. The communication network of claim 1, wherein the extra traffic is pre-configured into two levels of priority, the higher priority extra traffic being protected, the lower priority extra traffic being discarded in the event of a fault.

9. The communication network of claim 1, wherein the protection of the working traffic or of the displaced extra traffic is carried out according to signalling in SONET/SDH overhead.

10. The communication network of claim 1, wherein the protection paths are arranged in a mesh.

11. The communication network of claim 1, wherein the protection of the extra traffic comprises a head end ring switching operation.

12. The communication network of claim 1, wherein the nodes are arranged to time division multiplex the working from different sources over one or more of the working paths.

13. The communication network of claim 1, arranged to carry out the switching of the working traffic in the optical domain.

14. The communication network of claim 1, wherein the nodes are arranged to wavelength division multiplex working traffic from different sources into the same working path, and wavelength division multiplex the protection and working paths on a respective span.

15. A data communication network comprising a plurality of nodes, an arrangement of high priority paths between the nodes, for carrying high priority traffic and a plurality of lower priority paths between the nodes, for use by the high priority traffic in the event of a fault in one of the high priority paths, and for use otherwise by lower priority traffic, the lower priority paths forming a ring, the nodes being arranged to carry out a span switch operation to replace a respective one or more of the high priority paths by a corresponding one of more of the lower priority paths, the nodes further being arranged to carry out a ring switch to send at least some of the lower priority around the ring of lower priority paths, and avoid those of the low priority paths used by the span switch operation.

16. The communication network of claim 15, the high priority paths each comprising all or part of an optical transmission span.

17. The communication network of claim 15, the ring comprising a two fibre ring, and the ring switch comprising a two fibre ring switch operation.

18. A node for a data communication network, the network comprising a plurality of such nodes, linked by spans to carry working paths between the nodes, for use by working traffic and to carry protection paths wherein at least some of the protection paths form a protection ring, the node comprising a switch for switching extra traffic onto the protection paths when the protection paths are not being used for working traffic, the switch further being arranged to switch the wording traffic onto one or more of the protection paths from the protection ring in the event of a fault on one of the working paths, and to switch at least some of the displaced extra traffic onto an alternative path comprising the remainder of the protection ring by the displaced extra traffic.

19. The node of claim 18, arranged to switch the working traffic onto one or more of the protection paths by carrying out a span switch operation, and arranged to switch the displaced extra traffic onto an alternative path by carrying out a ring switch operation.

20. Software for the node of claim 19 for carrying out the span switch operation and the ring switch operation.

21. Software for the node of claim 18 for carrying out the switching of the extra traffic onto the protection path or the alternative path, and for carrying out the switching of the working traffic onto the working path or the protection path.

22. A method of operating a data communication network, the network comprising a plurality of nodes linked by spans, to carry working paths between the nodes for use by working traffic and to carry protection paths wherein at least some of the protection paths form a protection ring, the method comprising the steps of:

using the protection paths to carry extra traffic, when the protection paths are not being used for working traffic, using one or more of the from the protection ring to carry working traffic in the event of a fault on one of the working paths, and thus displace the extra traffic from the protection path or paths used by the working traffic, and using an alternative path comprising the remainder of the protection ring by the displaced extra traffic to protect at least some of the displaced extra traffic.

* * * * *